US009714547B2

(12) United States Patent
Curtiss, III et al.

(10) Patent No.: US 9,714,547 B2
(45) Date of Patent: Jul. 25, 2017

(54) MARINE DRILLING RISER CONNECTOR WITH REMOVABLE SHEAR ELEMENTS

(75) Inventors: Jason Post Curtiss, III, Houston, TX (US); Harris A. Reynolds, Jr., Houston, TX (US)

(73) Assignee: Diamond Offshore Drilling, Inc., Houston, TX (US)

( * ) Notice: Subject to any disclaimer, the term of this patent is extended or adjusted under 35 U.S.C. 154(b) by 355 days.

(21) Appl. No.: 12/648,037

(22) Filed: Dec. 28, 2009

(65) Prior Publication Data

US 2010/0164223 A1   Jul. 1, 2010

Related U.S. Application Data

(60) Provisional application No. 61/141,160, filed on Dec. 29, 2008.

(51) Int. Cl.
| E21B 17/06 | (2006.01) |
| F16L 25/06 | (2006.01) |
| E21B 17/08 | (2006.01) |
| F16L 37/244 | (2006.01) |

(52) U.S. Cl.
CPC ............ *E21B 17/06* (2013.01); *E21B 17/085* (2013.01); *F16L 25/065* (2013.01); *F16L 37/244* (2013.01)

(58) Field of Classification Search
CPC ....... E21B 17/046; E21B 17/06; E21B 17/085
USPC .................................................... 285/2, 922
See application file for complete search history.

(56) References Cited

U.S. PATENT DOCUMENTS

| 2,341,670 | A | * | 2/1944 | Stinson | 285/334 |
| 3,381,983 | A | * | 5/1968 | Hanes | 285/321 |
| 3,472,538 | A | * | 10/1969 | Wilder et al. | 285/374 |
| 3,585,803 | A | * | 6/1971 | Bardgette | 405/251 |
| 3,606,402 | A | * | 9/1971 | Medney | 285/305 |
| 3,827,728 | A | * | 8/1974 | Hynes | 285/90 |
| 4,068,865 | A | * | 1/1978 | Shanks, II | 285/90 |
| 4,097,069 | A |   | 6/1978 | Morrill | |
| 4,120,520 | A | * | 10/1978 | Ahlstone | 285/18 |
| 4,124,229 | A | * | 11/1978 | Ahlstone | 285/18 |
| 4,124,233 | A |   | 11/1978 | Ahlstone | |
| 4,280,719 | A |   | 7/1981 | Daniel et al. | |
| 4,293,148 | A |   | 10/1981 | Milberger | |
| 4,426,105 | A | * | 1/1984 | Plaquin et al. | 285/92 |
| 4,496,173 | A |   | 1/1985 | Roche et al. | |

(Continued)

FOREIGN PATENT DOCUMENTS

CN    2632290 Y    8/2004

OTHER PUBLICATIONS

Notification of Transmittal of the International Search Report and the Written Opinion of the International Searching Authority, or the Declaration issued in related International Application No. PCT/US2009/069736; Dated Aug. 20, 2010 (9 pages).

(Continued)

*Primary Examiner* — James M Hewitt
(74) *Attorney, Agent, or Firm* — Osha Liang LLP

(57) ABSTRACT

A riser joint connection includes a box connector having a box preload fixture, a pin connector having a pin preload fixture, at least one shear element configured to fit into at least one shear element cavity defined by a box connector shear groove in alignment with a pin connector shear groove, wherein the at least one shear element contacts load surfaces of the pin connector and the box connector.

7 Claims, 9 Drawing Sheets

(56) References Cited

U.S. PATENT DOCUMENTS

| | | | |
|---|---|---|---|
| 4,611,829 A * | 9/1986 | Hughes | 285/18 |
| 4,611,837 A * | 9/1986 | Aleck | 285/305 |
| 4,693,316 A * | 9/1987 | Ringgenberg et al. | 166/355 |
| 4,697,947 A | 10/1987 | Bauer et al. | |
| 5,050,911 A * | 9/1991 | Morrison | 285/2 |
| 5,954,374 A * | 9/1999 | Gallagher et al. | 285/332 |
| 6,179,347 B1 | 1/2001 | Dole et al. | |
| 6,224,112 B1 * | 5/2001 | Eriksen et al. | 285/3 |
| 6,352,288 B1 | 3/2002 | Calkins | |
| 6,419,277 B1 | 7/2002 | Reynolds | |
| 6,739,629 B2 | 5/2004 | Riedy et al. | |
| 6,921,114 B1 * | 7/2005 | Washburn et al. | 285/321 |
| 2008/0175672 A1 * | 7/2008 | Fraser | 405/170 |
| 2008/0302527 A1 * | 12/2008 | Coronado et al. | 166/242.1 |

OTHER PUBLICATIONS

Chinese Office Action issued in Application No. 200980157594.4, dated Apr. 15, 2013, and translation thereof (17 pages).
Extended European Search Report issued in European Application No. 09837132.1; Dated Apr. 12, 2017 (8 pages).

\* cited by examiner

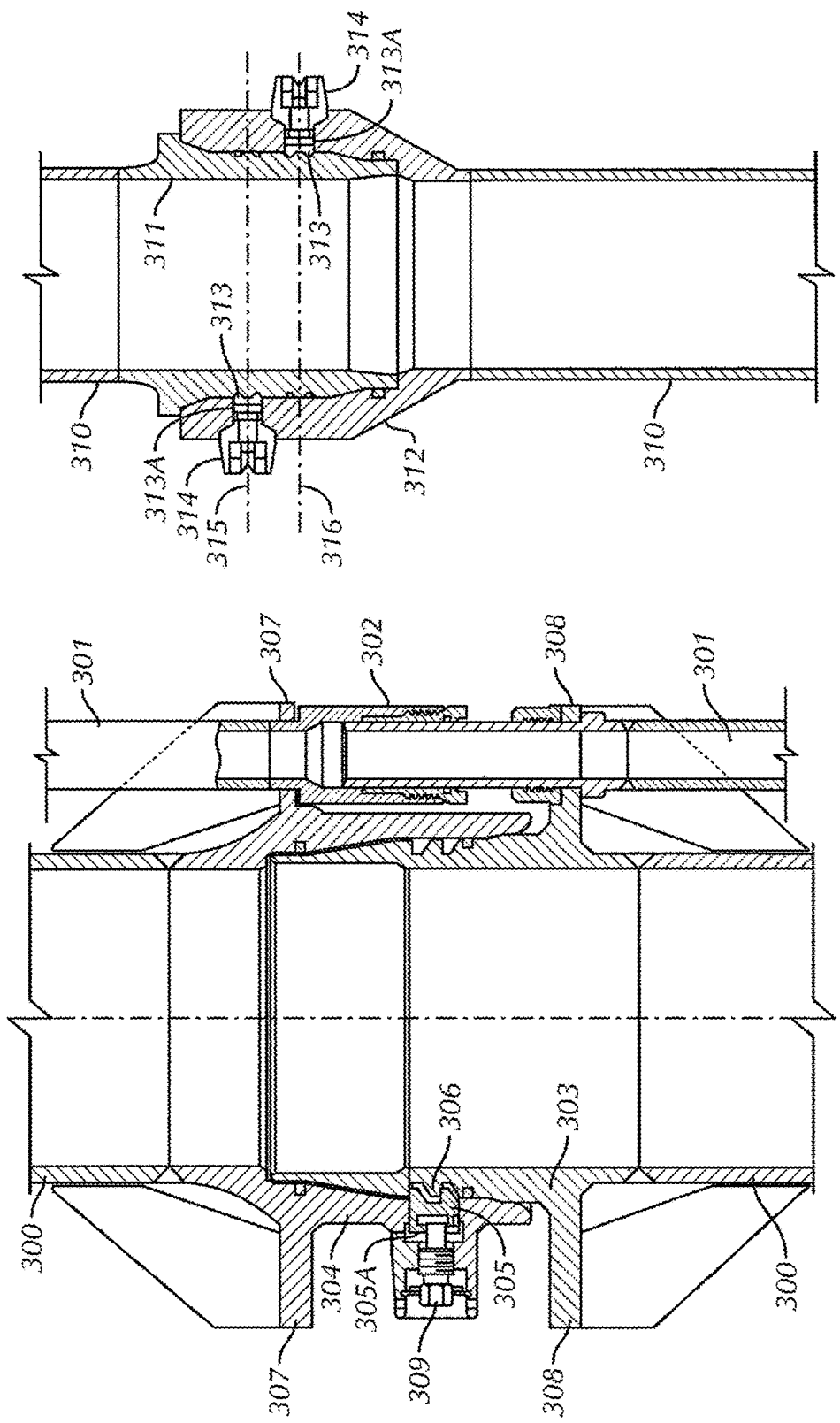

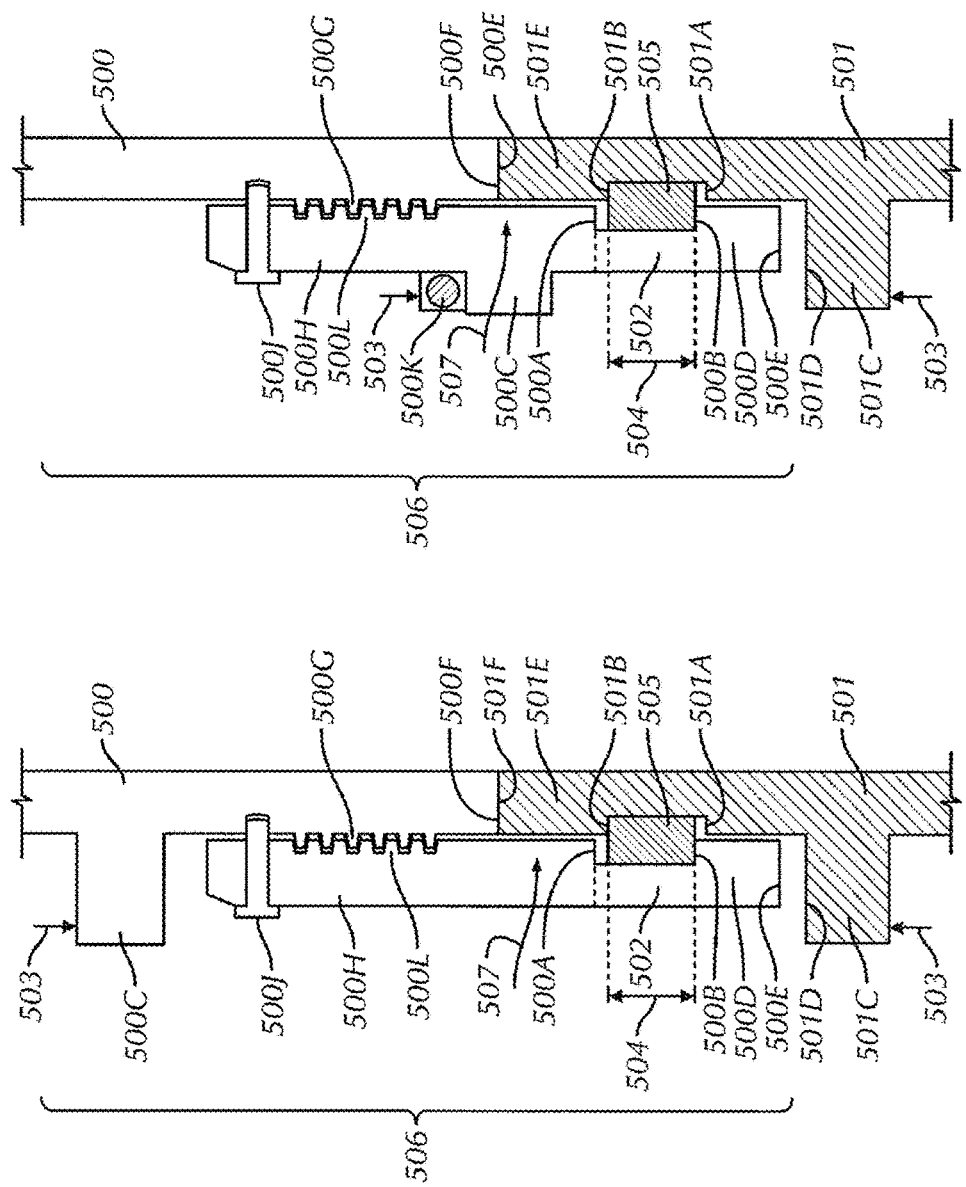

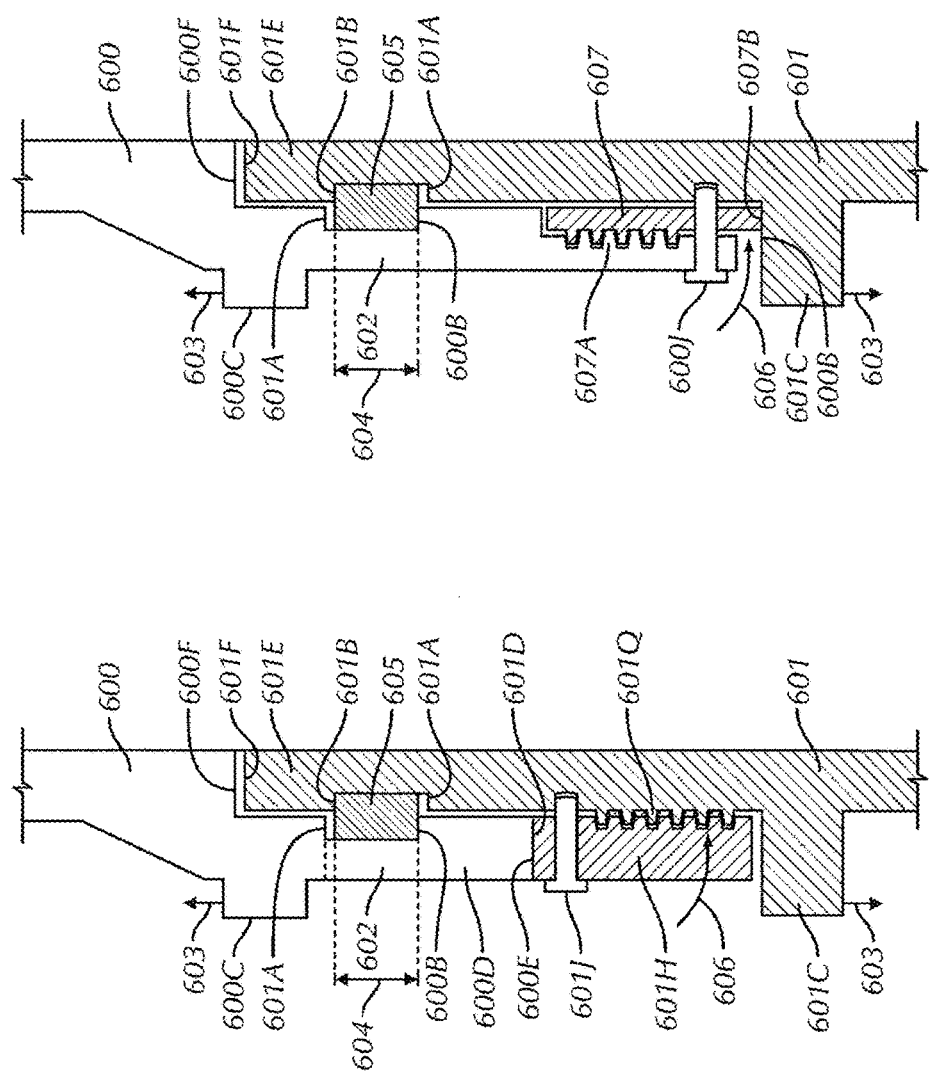

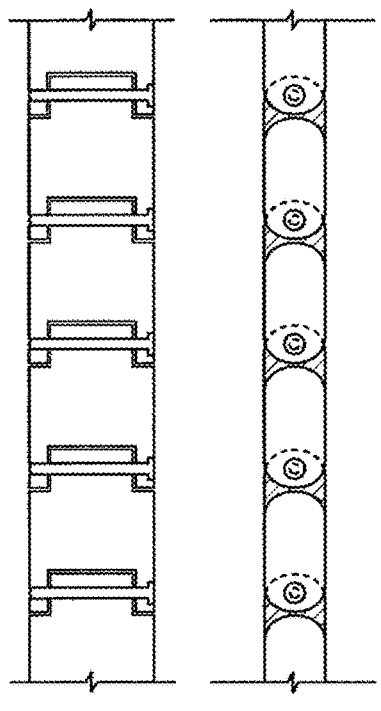 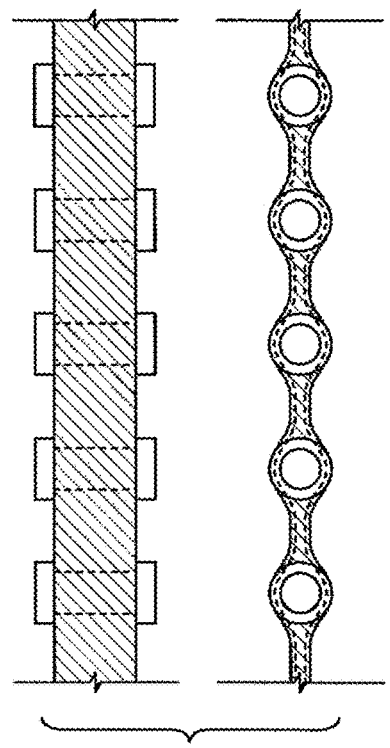
FIG. 8A    FIG. 8B
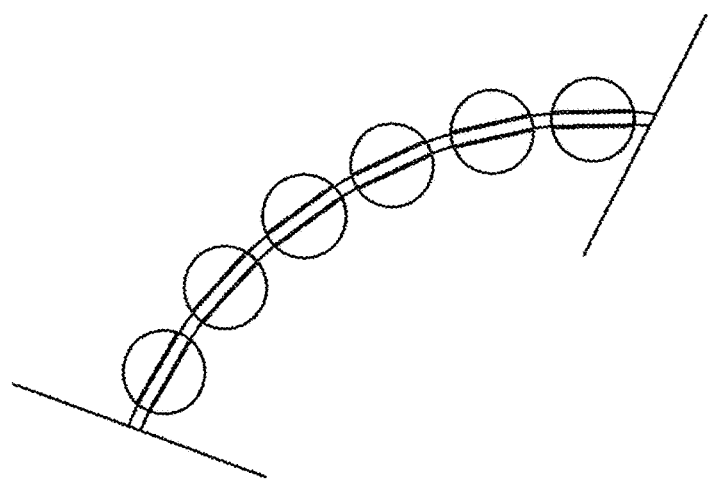
FIG. 8C

MARINE DRILLING RISER CONNECTOR WITH REMOVABLE SHEAR ELEMENTS

CROSS-REFERENCE TO RELATED APPLICATIONS

This application claims priority of a provisional application under 35 U.S.C. §119(e), namely U.S. Patent Application Ser. No. 61/141,160 filed Dec. 29, 2008, which is incorporated by reference in its entirety herein.

BACKGROUND

Field of the Disclosure

Embodiments disclosed herein relate generally to riser connections for conduits used in a marine drilling riser. More specifically, embodiments disclosed herein relate to a riser connection and method for joining together sections of marine drilling riser using removable shear elements.

Background Art

A marine drilling riser ("riser") is a jointed conduit which extends generally from a subsea blowout preventer ("BOP") stack located at the seabed to a floating drilling vessel such as a drillship or semisubmersible. Riser joints are typically between about 50 and 80 feet long and may be connected together by any of various forms of riser connectors to form a riser string. The riser functions to extend the wellbore from the seafloor to the surface and is used to return drilling fluid (or "drilling mud") and wellbore cuttings from a wellbore drilled into the seabed beneath the subsea BOP stack to the floating rig. In addition, a typical riser may include a number of auxiliary conduits positioned externally to the main riser conduit, which may include choke and kill lines, a riser mud-boost line, at least one hydraulic power conduit, and at least one subsea BOP control umbilical. Typically, the drilling riser joints may also be fitted with jacket-like foam buoyancy segments designed to reduce the apparent weight of the riser joint in seawater.

Riser connectors must withstand high, fluctuating loads over a very long service life (up to 20 years), while remaining robust, inexpensive to manufacture and repair, and as light as possible, consistent with their intended service. In modern offshore drilling, it has also become increasingly beneficial that the riser connector can be assembled and disassembled quickly in order to minimize riser running time, especially because drilling is now taking place in deeper water, and because the cost per day for floating drilling vessels are very high.

For example, the most common type of riser connector in use today (e.g., a bolted flanged connector) can be assembled or disassembled at a rate of only about 3 to 4 joints per hour. For modern riser joints, typically about 75 feet in length, this yields a tripping rate on the order of 300 feet per hour. Tripping-out a 6000 foot long riser would therefore take approximately 20 hours. Because modern floating drilling vessel costs may exceed $20,000 per hour, costs may be minimized by reducing the riser trip time as much as possible. Despite the fact that they are very slow to run, bolted flanged riser connectors do, however, offer the advantages that they are reliable, repairable, and relatively inexpensive.

Various attempts have been made in the past to produce a riser connector which may be run more quickly than a conventional flanged marine drilling riser connection, while retaining its advantages. Some prior-art marine riser connectors use a threaded connector; however, because the riser must carry auxiliary conduits, such as the choke and kill lines, as well as buoyancy segments, a threaded riser connection for a marine drilling riser must typically either be of the "union" type, such as taught in U.S. Pat. No. 4,496,173 ("the '173 patent") issued to Roche, or must include a provision for the central riser tube to otherwise rotate relative to the auxiliary conduits and buoyancy segments, as taught in U.S. Pat. No. 6,419,277 ("the '277 patent") issued to Reynolds.

FIG. 1A illustrates the prior-art threaded marine drilling riser connection taught in the '173 patent. The riser connection includes an upper riser pipe section 1, a lower riser pipe section 2, and choke and kill line sections 3A, 3B, 4A and 4B that are supported by upper riser pipe section 1 and lower riser pipe section 2 respectively. The choke and kill lines are joined together at the riser connector by choke and kill connectors 5A and 5B. Female union box member 6 on upper riser pipe section 1 is threaded by spin-up threads 6A to pin member 7, which is welded to lower riser pipe section 2. Preload is applied to the riser connection by power threads 8A between female union box member 6 and power ring 8. Spin-up threads 6A are opposite hand to power threads 8A, that is, one is right-handed and the other is left-handed.

In order to prevent female union box member 6 from becoming loosened because of vibrations from drilling and the action of subsurface currents on the riser string (such as vortex-induced vibration, or VIV), a locking member or key 9 is slidingly displaced into notch 10 to lock the female union box member 6 against rotation relative to pin member 7.

FIG. 1B illustrates the prior-art threaded riser connection taught in the '277 patent. Riser joint 15 has male ("pin") end threads 11 and female ("box") end threads 12. Auxiliary conduits 13, such as choke & kill lines, mud boost lines, and hydraulic conduits, have auxiliary line connectors 17, and are attached to marine drilling riser joint 15 by means of flanges 14 and bearings 16. Because flanges 14 are coupled to joint 15 through bearings 16, joint 15 can be rotated while flanges 14 and auxiliary conduits 13 remain rotationally fixed. This enables joint 15 to be connectable to other such joints using conventional threaded coupling methods.

Due to the requirement for a large diameter bearing, which must survive relatively high cyclical loads in a salt-water environment, and due to the difficulty of applying high make-up and break-out torques in and among the auxiliary conduits, the riser connectors of the '277 patent may be prohibitively expensive to build and use.

Either of these riser connection types may be expensive to manufacture, and may rely on the application of very high make-up torque to achieve sufficient axial preload. Further, some provision must generally be made to insure that the threads are locked in a made-up position so that they don't unscrew or "back-out" due to, for example, cyclic loads or vibration, in particular vortex-induced-vibration ("VIV"). In addition, threaded connections are generally not designed to share the loads evenly and efficiently along the axial length of the threads, and are typically subject to the same fatigue limitations as any shouldered threaded connection. Finally, threaded riser connections installed on the riser are difficult, if not impossible, to repair, and in no known example are they repairable on-board a typical floating drilling vessel.

Other prior-art riser connections use a "breech-lock" or "bayonet" or interrupted-thread arrangement, such as taught in U.S. Pat. No. 4,097,069 ("the '069 patent") issued to Morrill and U.S. Pat. No. 4,280,719 ("the '719 patent") issued to Daniel. Such "breech-lock" connectors typically make-up or break-out in less than one revolution, are very robust, and typically may be tripped very quickly. However, they generally still require a very high make-up torque and some mechanism to prevent accidental break-out, and are very heavy and extremely expensive to build. In particular, because the load-bearing part of a breech-lock style connector must necessarily extend to only about half of the circumference of the connector, axial loads are carried by the connector in a discontinuous fashion, and the load-bearing parts must therefore be extremely robust, which consequently makes them very heavy and expensive.

FIG. 2A illustrates the prior-art "bayonet" or "breech-lock" type riser connection for a riser as taught in the '069 patent. Riser joint 23 has female connector member 26, male connector member, and auxiliary line flanges 22 attached, as by welding. Auxiliary line flanges 22 support choke auxiliary line 20 and kill auxiliary line 21, which have choke line connector 20A and kill line connector 21A respectively. Female connector member has shoulder 26A which supports connector nut 24. Connector nut 24 has locking mechanism 29 and female tapered lugs 25 with upper inclined surfaces 25A. Male connector 27 has male tapered lugs 28 with lower inclined surfaces 28A.

When making up the riser connection of the '069 patent, the connector nut 24 is lowered over male connector 27, and the connector nut is rotated such that the lower inclined surfaces 28A on male tapered lugs 28 engage with the corresponding upper inclined surfaces 25A on female tapered lugs 25. Finally, locking mechanism 29 is engaged to insure against loosening (or "back-out") of the made-up riser connection.

FIG. 2B illustrates a prior art double-row "bayonet" type riser connection for a riser, as taught in the '719 patent. Riser joint 201 has auxiliary line 210, auxiliary line supports 211, and auxiliary line connector 212. Riser joint 201 is attached, as by welding, to auxiliary line support ring 202, which is attached in turn to male element 204. The other end of riser joint 201 is attached to female element 203.

Locking ring 206 is fitted with bayonet-type upper lugs 207A and lower lugs 208A, which interlock cooperatively with upper lugs 207B and lower lugs 208B respectively on female member 203 when locking ring 206 is rotated relative to female member 203. Once the bayonet lugs are properly engaged, locking ring 206 is secured against backing-off (and disengaging the bayonet coupling) by pinned locking ring lock 209. Locking ring 206 is secured in an interlocked position by locking mechanism 209, and the entire riser connection is axially preloaded by tightening ring 205 which, when torqued, bears on shoulder 204A on male element 204. This connector may be run relatively quickly, but due to the complicated load-path and critical tolerances, is difficult to machine and repair, and is relatively heavy and expensive.

Still other prior-art riser connections used radially-displaced shear elements in the box connector to radially grip a profile in the mating pin connector, for example, the pipe connectors taught in U.S. Pat. No. 3,827,728 ("the '728 patent") issued to Hynes. A later version of this connector taught in U.S Publication No. 2008-0175672 ("the '672 publication") issued to Fraser uses two staggered rows of radially-displaced shear elements or "dogs." Like the bayonet riser connections, radial dog riser connections require a certain amount of "supporting metal" in the box riser connection for each dog, with the result that these riser connections tend to be bulky, heavy and expensive.

FIG. 3A illustrates the riser connector as taught in the '728 patent. Riser joints 300 have auxiliary line 301 with auxiliary line connector 302, pin member 303, and box member 304. Auxiliary line 301 is affixed to pin member 303 by integral flange 308, and to the box member 304 by flange 309. Box member 304 has a plurality of windows 305A containing dogs 305 which are arranged to be shifted inwardly to engage one or more circumferentially continuous external grooves 306 in pin member 303. Dogs 305 are substantially arcuate to better match external grooves 306. Windows 305A are circumferentially spaced from one another, generally on a single horizontal plane. Dogs 305 are locked in engagement with external grooves 306 by locking mechanism 309. However, the strength of this riser connection may be limited by the shear area available in the dogs, which in turn is limited by the amount of supporting metal required for each dog and its window. Additionally, the need for a light riser of a relatively small diameter is difficult to achieve due to the limited shear area available.

FIG. 3B illustrates the related riser connector as taught in the '732 publication. This riser riser connection is an attempt to increase the number of load-carrying dogs available in a dog-type riser without increasing the diameter of the connector and with only a minimal increase in weight. Riser 310 has pin member 311 and box member 312. Box member has windows 313A containing dogs 313 and locking mechanisms 314. However, in this connector, windows are disposed in a staggered pattern in a plurality of rows, shown here as upper row 315 and lower row 316; that is, the windows in upper row 315 are circumferentially displaced (or "staggered") in relationship to the circumferential position of the windows in lower row 316. However, neither the '728 patent of the '732 publication contemplate a redundant load path (e.g., to be used if the primary load is damaged), nor do they contemplate reconditioning of the riser connection on-board a drilling vessel.

Accordingly, there exists a need for a quick-tripping riser connection for a marine drilling riser which is also relatively light in weight, economical to produce, reliable in service, with provision for a redundant or secondary or emergency load-path, which has the capacity for a very high axial preload, and which may be reconditioned cheaply and quickly, even on-board a drilling vessel.

SUMMARY OF THE DISCLOSURE

In one aspect, embodiments disclosed herein relate to a riser joint connection including a box connector having a box preload fixture, a pin connector having a pin preload fixture, at least one shear element configured to fit into at least one shear element cavity defined by a box connector shear groove in alignment with a pin connector shear groove, wherein the at least one shear element contacts load surfaces of the pin connector and the box connector.

In another aspect, embodiments disclosed herein relate to a method of connecting riser joints, the method including landing a box connector over a pin connector, applying a selected axial preload to the box and pin connector, inserting at least one shear element through a shear element port into a shear element cavity formed between a box connector shear groove and a pin connector shear groove, and removing the preload and compressively engaging the at least one shear element with load surfaces of the pin connector and the box connector.

In one aspect, embodiments disclosed herein relate to a riser joint connection including a box connector having a box preload fixture, a pin connector having a pin preload fixture, at least one shear element configured to fit into at least one shear element cavity defined by an internal box connector shear groove in alignment with an external pin connector shear groove, wherein the at least one shear element contacts load surfaces of the pin connector and the box connector.

In another aspect, embodiments disclosed herein relate to a method of connecting riser joints, the method including landing a box connector over a pin connector, applying a selected axial preload to the box and pin connector, inserting at least one shear element through a shear element port into a shear element cavity formed between an internal box connector shear groove and an external pin connector shear groove, and removing the preload and compressively engaging the at least one shear element with load surfaces of the pin connector and the box connector.

Other aspects and advantages of the invention will be apparent from the following description and the appended claims.

BRIEF DESCRIPTION OF DRAWINGS

FIG. 3A is a cross-sectional view of a radial dog marine drilling riser connection in accordance with prior art;

FIG. 3B is a cross-sectional view of a radial dog marine drilling riser connection in accordance with prior art;

FIGS. 5A and 5B are cross-sectional views of a marine drilling riser connection in accordance with additional embodiments of the present disclosure;

FIGS. 6A and 6B are cross-sectional views of a marine drilling riser connection in accordance with additional embodiments of the present disclosure;

FIGS. 8A-8C are assembly views of a bandolier of shear elements in accordance with embodiments of the present disclosure;

FIG. 9 is a cross-sectional view of a marine drilling riser connection in accordance with embodiments of the present disclosure.

DETAILED DESCRIPTION

Various embodiments disclosed herein relate to riser connections and methods to join sections of a marine drilling riser together using removable shear elements.

Figure 1A:
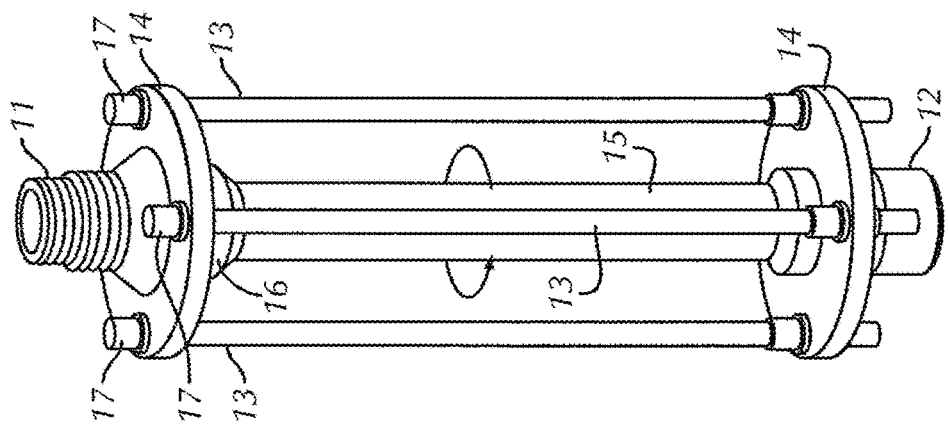
FIG. 1A is a cross-sectional view of a threaded marine drilling riser connection in accordance with prior art.
Figure 1B:
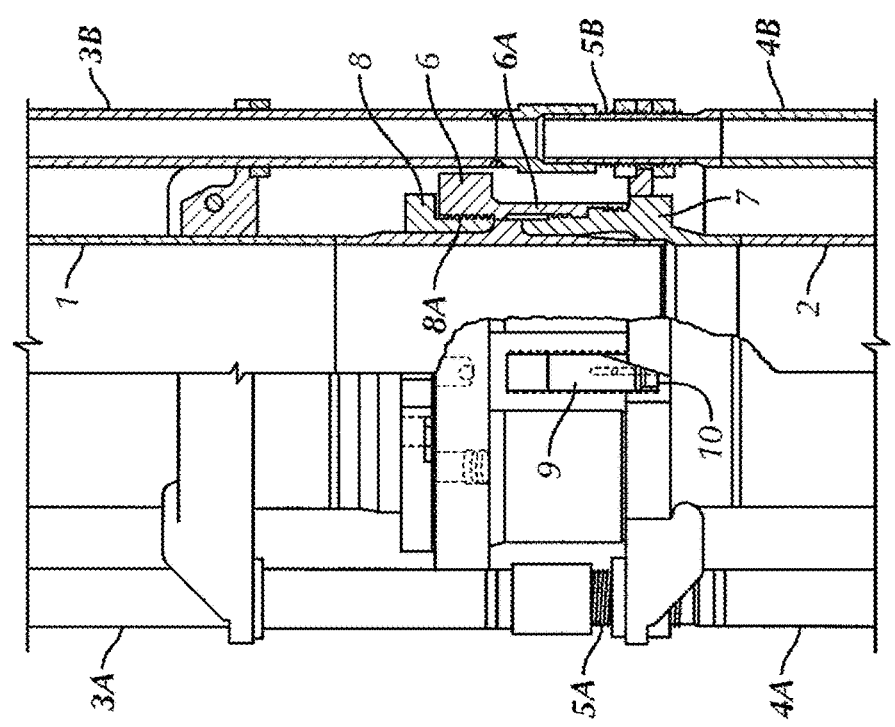
FIG. 1B is an assembly view of a threaded marine drilling riser connection in accordance with prior art.
Figure 2A:
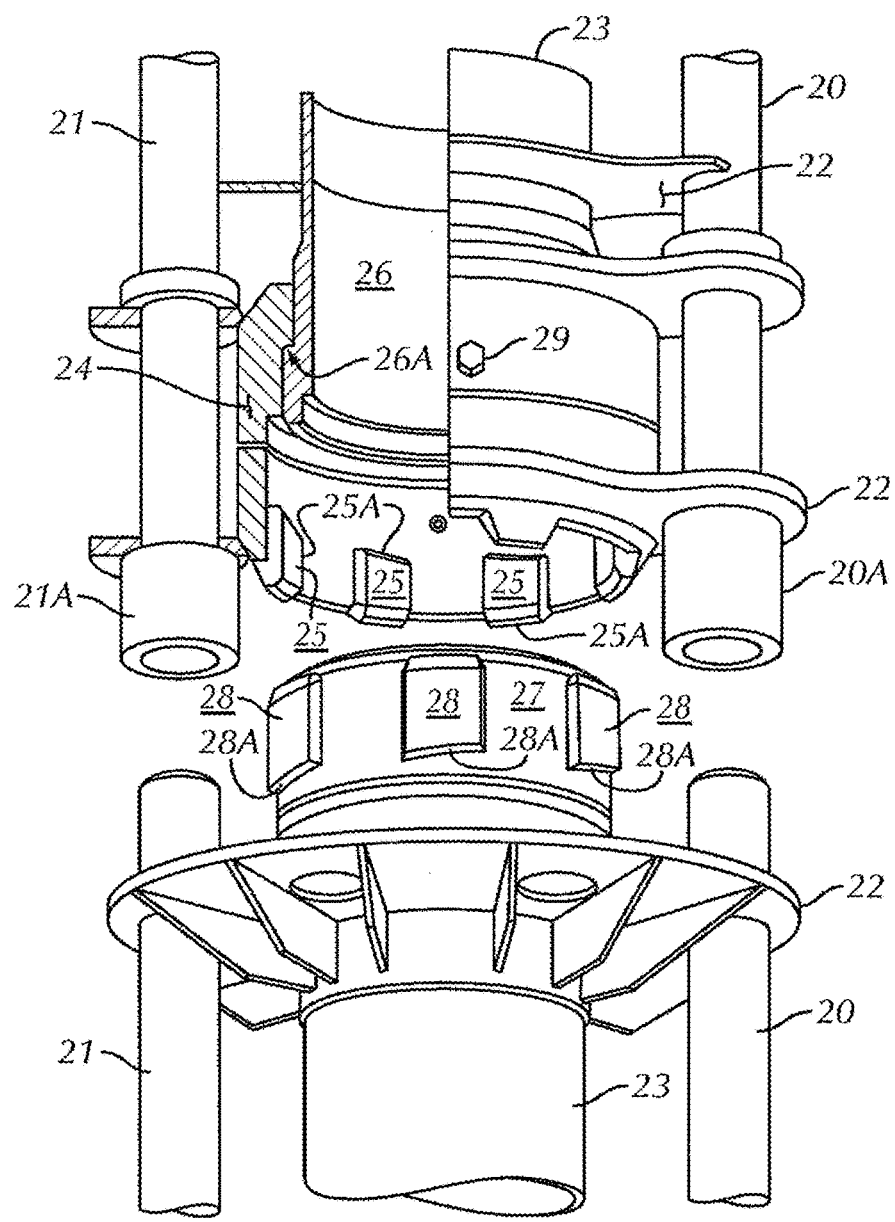
FIG. 2A is an assembly view of a bayonet style marine drilling riser connection in accordance with prior art.
Figure 2B:
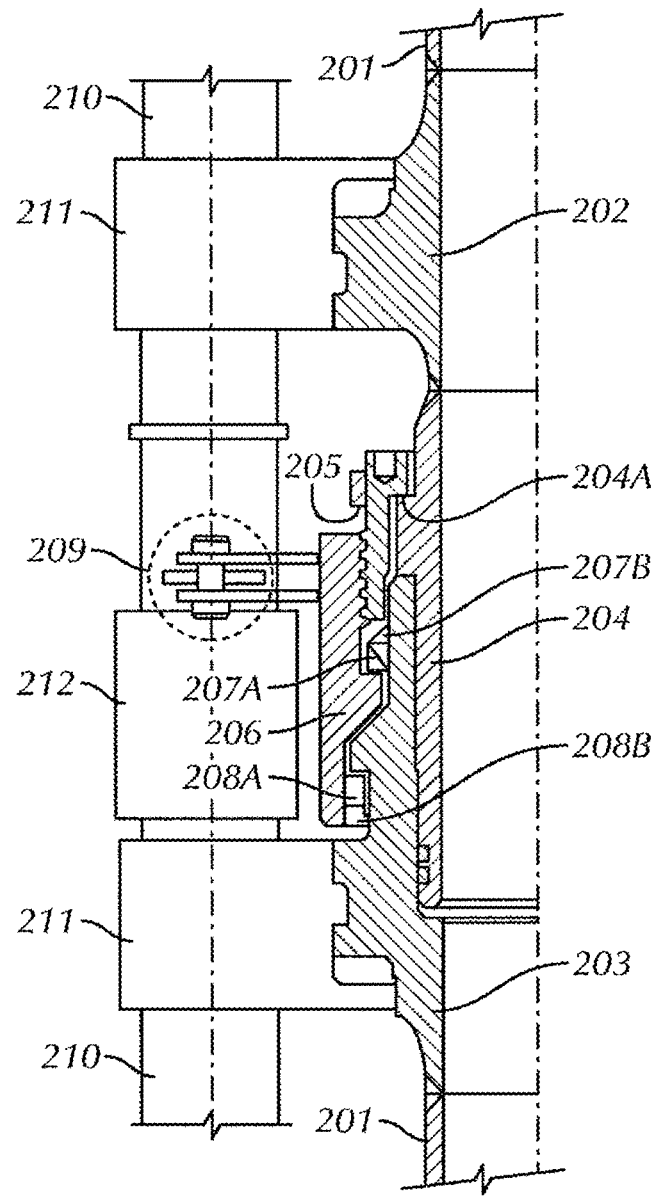
FIG. 2B is a cross-sectional view of a bayonet style marine drilling riser connection in accordance with prior art.
Figure 4A:
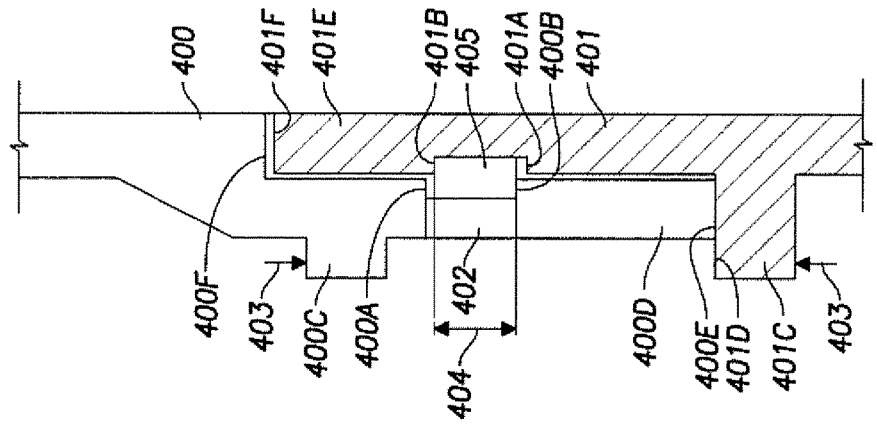
FIGS. 4A-4C are cross-sectional views of a marine drilling riser connection in accordance with embodiments of the present disclosure.
Figure 4B:
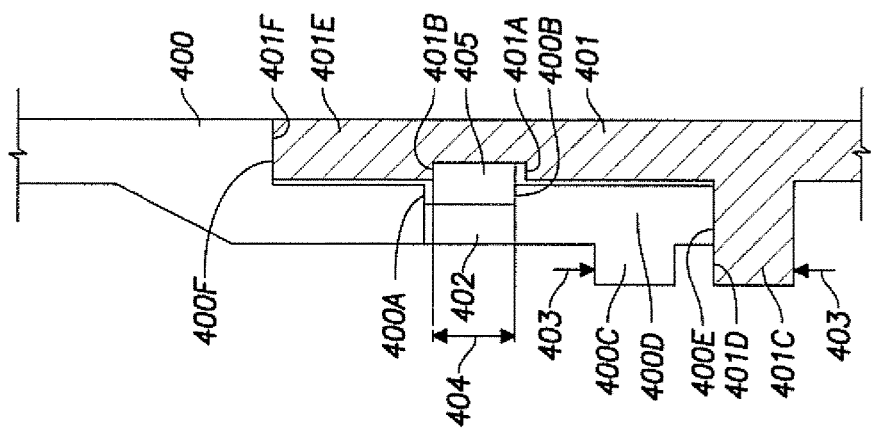
Figure 4C:
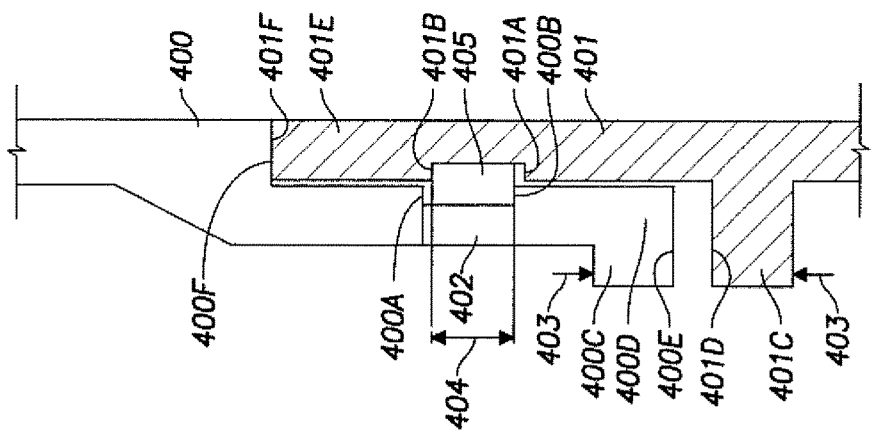

Referring initially to FIGS. 4A-4C, cross-sectional views of a connector that may be preloaded in compression (i.e., the riser connection is "squeezed together" during preload), after which axial shear elements may be inserted into the riser connection (while the preload is applied to the riser connection) are shown in accordance with embodiments of the present disclosure.

The riser connector includes a box connector 400, which includes a box shear groove 400A, a box load surface 400B, a box preload fixture 400C, a box face 400D, a box face surface 400E, and a box bore shoulder 400F. Additionally, the riser connector includes a pin connector 401, which includes a pin shear groove 401A, a pin load surface 401B, a pin preload fixture 401C, a pin connector shoulder 401D, a pin nose 401E, and a pin nose surface 401F.

Preload fixtures 400C and 401C may be circumferential flanges as shown, or, in alternate embodiments, may be radially-spaced hooks, eyelets, circumferential grooves, or any other device which allows the attachment of a device to apply axial compressive preload force 403. The device to apply preload may be located on the rig floor to be employed when the riser is run or retrieved, or in the alternative, may be permanently mounted on box connector 400 or pin connector 401 (and thus be a part of the riser assembly). In certain embodiments, the device to apply the preload 403 may be integral to the riser spider, which is used to support the riser string hanging below the rig as the riser is run or retrieved. In still further embodiments, a hoisting mechanism, typically used to raise and lower tubular joints, may be used to provide the upward preload 403 on the pin connector by raising the joint against the device applying the preload 403 downward on the box connector. Those skilled in the art will appreciate the limitations of the hoisting mechanism to perform this operation. When the riser connections are fully assembled (or "made-up") as shown, shear elements 405 may fit into the shear cavity defined by shear groove 400A on the box connector and shear groove 401A on the pin connector. Shear elements 405 thus define the shear height 404 between load surfaces 400B and 401B when the riser connection is made-up.

FIG. 4A illustrates a pin-nose shouldered embodiment with a compressive preload in the pin-nose, that is, when the connector is assembled as shown, the pin nose 401E retains a compressive preload. The riser connection of FIG. 4A may be assembled as follows: (a) box riser connection 400 is landed over pin connector 401 such that box bore shoulder 400F is resting on pin nose surface 401F, (b) a selected preload force 403 is applied to preload fixtures 400C and 401C, which enlarges the shear height 404 between load surfaces 400B and 401B, (c) shear elements 405 are inserted through shear element port 402 into the cavity formed between shear groove 400A and 401A, and (d) preload 413 is removed. In this embodiment, box face 400D is not in compression in the made-up riser connection, that is, box face surface 400E may not be in contact with pin connector shoulder 401D.

FIG. 4B illustrates a double-shouldered riser connection in accordance with embodiments of the present disclosure. The double-shouldered riser connection includes a compressive preload in both the pin-nose and in the box face, that is, when the riser connection is assembled as shown, both the pin nose 401E and the box face 400D retain a compressive preload. The riser connection of FIG. 4B may be assembled as follows: (a) box riser connection 400 is landed over pin connector 401 such that box bore shoulder 400F is resting on pin nose surface 401F, at which point there will typically be a small gap between box face surface 400E and pin connector shoulder 401D, (b) a selected preload force 403 is applied to preload fixtures 400C and 401C, which enlarges the shear height 404 between load surfaces 400B and 401B, and brings into compressive contact box face surface 400E and pin connector shoulder 401D, (c) shear elements 405 are inserted through shear element port 402 into the cavity formed between shear groove 400A and 401A, and (d) preload 403 is removed.

Alternately, box connector 400 may be landed over pin connector 401 such that box face surface 400E is resting on pin connector shoulder 401D, and there is a small gap between box bore shoulder 400F and pin nose surface 401F, such that when the riser connection is assembled as shown both the pin nose 401E and the box face 400D retain a compressive preload.

Those having ordinary skill will recognize that the amount of preload retained in the riser connections shown in FIGS. 4A-4C may depend on difference between the shear height 404 of riser connection with an applied preload and the height of the inserted shear elements 405. A large difference (i.e., a large axial gap between the shear elements and at least one of the load surfaces during preload) will make insertion and removal of the axial shear elements easier, but naturally a smaller percentage of the applied preload may be retained in the riser connection.

Those having ordinary skill will also recognize that the increase in shear height 404 during preload, for a given selected axial compressive preload, may depend on the length of the compressed member or members, as the preload strain is inches-per-inch. In the embodiment of FIG. 4A, the pin nose may typically be quite long, say on the order of 12-24 inches, in order for the riser connection to axially strain enough to allow easy insertion and removal of shear elements 405, yet preserving adequate preload after the elements are inserted.

FIGS. 5A and 5B show cross-sectional views of a riser connection that includes an adjustable box section which allows axial displacement of box shear groove 500A before or during preloading in accordance with embodiments of the present disclosure.

The riser connection shown in FIG. 5A has box connector assembly 506 that includes a box connector 500 and an adjustable box section 500H. Box connector 500 includes a box preload fixture 500C, a box bore shoulder 500F, box outer diameter ("OD") threads 500G, and adjustable box section 500H. Adjustable box section 500H includes box inner diameter ("ID") threads 500L, a thread locking mechanism 500J, a box shear groove 500A, a box load surface 500B, a box face 500D, and a box face surface 500E. The riser connection also has a pin connector 501 that includes a pin shear groove 501A, a pin load surface 501B, a pin preload fixture 501C, a pin connector shoulder 501D, a pin nose 501E, and a pin nose surface 501F.

The riser connection of FIG. 5A may be assembled as follows: (a) box connector assembly 506 is landed over pin connector 501 such that box bore shoulder 500F is resting on pin nose surface 501F, (b) shear elements 505 are inserted through shear element port 502 into the cavity formed between box shear groove 500A and pin shear groove 501A, (c) a selected compressive preload force 503 is applied to preload fixtures 500C and 501C, (d) adjustable box section 500H is adjusted upwards by threads 500G and 500L to remove axial clearance between shear elements 505 and load surfaces 500B and 501B, and locked in place by thread locking mechanism 500J, and (e) preload force 503 is removed.

Alternately, additional preload (beyond preload force 503) may be put into the riser connection by applying a substantial selected make-up torque 507 to the box threads 500H and 500L while a selected compressive preload force is applied (that is, during step (d) above).

The riser connection shown in FIG. 5B is similar to that in FIG. 5A, except that box preload fixture 500C is located on adjustable box section 500H rather than box connector 500 and as such, may be fitted with an optional preload bearing 500K to facilitate the rotation of adjustable box section 500H while axial preload 503 is applied. The riser connection of FIG. 5B may be made-up by one of two methods. In a first method, the riser connection is made up like the riser connections shown in FIGS. 4A-4C, that is, the riser connection is preloaded before the shear elements are inserted. In the first method, the adjustable box section 500H is used to tailor the shear height 504 to an optimum value, and locked in place with the thread locking mechanism 500J before the shear elements are inserted. In this method, optional preload bearing 500K is not required. The first method allows the use of re-machined shear elements (where, for example, spalling or other damage has been removed from the shear elements, rendering them a different height).

In a second method, the riser connection is made-up by simultaneously applying a selected axial preload 503 and a selected make-up torque 507 to the adjustable box section. In this case, optional preload bearing 500K may be beneficial. Preload bearing 500K may include a bearing or bushing mounted on adjustable box section 500H and/or on box preload fixture 500C, or it may be a bearing or bushing mounted on an external preloading device (not shown) which cooperates with box preload fixture 500C.

For the embodiments depicted in FIGS. 5A and 5B, when selected axial preload 503 and selected make-up torque 507 are both applied, they may each be selected to provide the highest possible net preload to the riser connection based on the design of threads 500G and 500L, and the available axial preload and torsional make-up equipment. For example, if the equipment providing axial preload 503 has limited capacity, additional make-up torque 507 may be used to compensate, within the design limits of threads 500G and 500L. Alternately, it may be desired to have a preload gradient along the length of the riser string, where for example the riser joints at the top of the string (that is, nearer the surface of the water) have a higher preload than the riser joints in deeper water; in this case, one selected axial preload 503 may be used, and different make-up torques 507, depending on the ultimate position of the riser riser connection in the string. Those having ordinary skill in the art will recognize that make-up torque 507 may be applied to those riser connections in an number of conventional ways, including through spanner holes or grooves or slots which may be arranged, for example, radially or parallel to the axis of the riser.

FIGS. 6A and 6B show cross-sectional views of a riser connection that includes adjustable load shoulders to preserve an applied tensile preload and, optionally, to contribute to the preload or exclusively induce an axial preload in accordance with embodiments of the present disclosure. Referring to FIG. 6A, the riser connection has a box connector 600, which includes a box shear groove 600A, a box load surface 600B, a box preload fixture 600C, a box face 600D, and a box bore shoulder 600F. The riser connection also has a pin connector 601, which includes a pin shear groove 601A, a pin load surface 601B, a pin preload fixture 601C, a pin nose 601E, and a pin nose surface 601F. Further, the riser connection shown in FIG. 6A includes a box face surface 600E and an adjustable pin shoulder ring 601H, which is threadably coupled to pin connector 601 with threads 601G, and which has pin connector shoulder 601D and thread locking mechanism 601J.

Alternatively, the embodiment shown in FIG. 6B has an adjustable box face ring 607 which is threadably and concentrically coupled to box riser connection 600 with threads 607A, and which has adjustable box face surface 607B and thread locking mechanism 600J.

The riser connection of FIG. 6A may be assembled by the following method: (a) box connector 600 is landed over pin connector 601 such that box bore shoulder 600F is resting on pin nose surface 601F, (b) shear elements 605 are inserted through shear element port 602 into the cavity formed between box shear groove 600A and pin shear groove 601A, (c) a selected tensile preload force 603 is applied to preload fixtures 600C and 601C, (d) adjustable pin shoulder ring 601H is adjusted upwards by thread 601G to remove axial clearance between pin connector shoulder 601D and box face surface 600E, and locked in place by thread locking mechanism 600J, and (e) tensile preload force 603 is removed.

Alternately, additional axial preload (beyond selected tensile preload force 603) may be put into the riser connection by applying a substantial selected make-up torque 606 to the adjustable pin shoulder ring 601H during step (d) immediately above.

In an alternate method, the riser connection of FIG. 6A may be assembled as follows: (a) box connector 600 is landed over pin connector 601 such that box bore shoulder 600F is resting on pin nose surface 601F, (b) shear elements 605 are inserted through shear element port 602 into the cavity formed between box shear groove 600A and pin shear groove 601A, (c) adjustable pin shoulder ring 601H is adjusted upwards by thread 601G to remove axial clearance between pin connector shoulder 601D and box face surface 600E and (d) a selected axial preload force 603 is applied to the riser connection by rotating pin shoulder ring 601H to a high torque 606, and (e) pin shoulder ring 601H is locked in place by thread locking mechanism 600J.

Those having ordinary skill will recognize that a selected axial preload 603 may be applied to the riser connections shown in FIG. 6A or 6B by any combination of a selected tensile preload force 603 and the application of selected torque 606 to pin shoulder ring 601H.

The riser connection of FIG. 6B may be assembled by the following method: (a) box connector 600 is landed over pin connector 601 such that box bore shoulder 600F is resting on pin nose surface 601F, (b) shear elements 605 are inserted through shear element port 602 into the cavity formed between box shear groove 600A and pin shear groove 601A, (c) a selected tensile preload force 603 is applied to preload fixtures 600C and 601C, (d) adjustable box face ring 607 is adjusted downward by thread 607A to remove axial clearance between pin connector shoulder 601D and adjustable box face surface 607B, and locked in place by thread locking mechanism 600J, and (e) tensile preload force 603 is removed.

In an alternate method, additional axial preload (beyond selected tensile preload force 603) may be put into the riser connection by applying a substantial selected make-up torque 606 to adjustable box face ring 607 during step (d) immediately above.

Figures 7A, 7B:
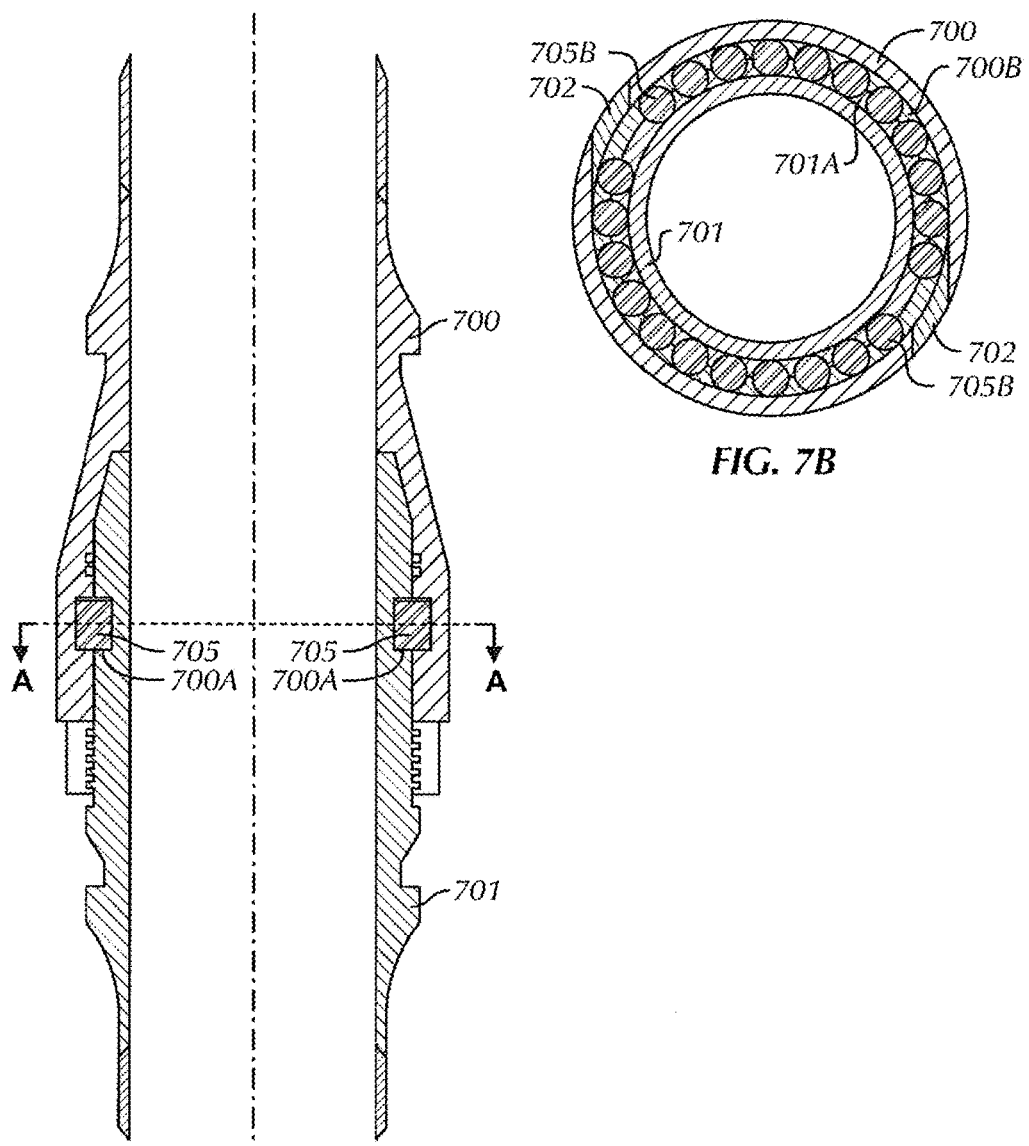
FIGS. 7A and 7B are cross-sectional views of a marine drilling riser connection in accordance with additional embodiments of the present disclosure.

Referring now to FIGS. 7A and 7B, cross-sectional views of a riser connection in accordance with embodiments of the present disclosure are shown. FIG. 7A illustrates box connector 700 having a box shear groove 700A, pin connector 701 having a pin shear groove 701A, and axial shear elements 705. FIG. 7B is a cross-section (view at section 'A-A') of the assembled riser connection shown in FIG. 7A, with box connector 700, box shear groove 700A, pin connector 701, pin shear groove 701A, and shear element ports 702.

In the embodiment shown in FIGS. 7A and 7B, there are two substantially tangential shear element ports 702, so that two separate "bandoliers" of shear elements, 705A and 705B, may be used; one bandolier inserted through each shear element port 702. In this embodiment, radial pins (or other similar devices) may be installed in box shear groove 700A and or pin shear groove 701A to act as a "stop" for the shear element bandolier, provided, of course, that the stops do not interfere with make-up or break-out of the connectors.

Note that for purposes of clarity, FIGS. 4-7 are substantially schematic representations of embodiments of the present disclosure, and may not show certain features which will be understood by those having ordinary skill to be required in a practical riser connector. These features include, but are not limited to, such features as seals between the box and the pin connector, a tapered nose to facilitate stabbing, internal circumferential grooves to accommodate a riser running tool, brackets or flanges to hold and support auxiliary lines, and means of connecting, such as by welding, the riser connectors to riser pipe.

Further, the embodiments of the present disclosure as shown in FIGS. 4-7 are depicted with a single circumferential shear cavity formed by the pin shear groove and the box shear groove. However, the riser connections may alternately have two or more circumferential cavities and/or one or more helical cavities without departing from the teachings of the present disclosure.

In certain embodiments of the present disclosure, at least one shear element cavity formed between the two mating riser joints may be substantially circumferential. In another embodiment, at least one shear element cavity may be substantially helical. In still another embodiment of the present disclosure, there may be a plurality of circumferential cavities. Further, a plurality of circumferential cavities may have different spacing between their shear flanks such that when used with common removable shear elements, the axial load may be equalized between the cavities when the riser is in service. In another embodiment, the respective axial loads carried by each of the plurality of circumferential cavities may be equalized by using removable shear elements of different sizes in each of the respective shear cavities.

Further, in certain embodiments of the present disclosure, there are a plurality of shear element cavities, at least one of which is a backup cavity reserved for use in case a primary cavity is damaged. For example, referring to FIG. 9, a cross-sectional view of a connector for a riser connection having a plurality of shear element cavities is shown in accordance with embodiments of the present disclosure. The riser connector includes a box connector 900 having a first box shear groove 900A and a second box shear groove 900B, and additionally includes a pin connector 901 having a first pin shear groove 901A and a second pin shear groove 901B. As such, a first shear element 905A may be disposed within a first shear cavity defined by the first box shear groove 900A and the first pin shear groove 901A, and a second shear cavity defined by the second box shear groove 900B and the second pin shear groove 901B may be used as a backup cavity. In another embodiment, there are two primary shear element cavities and one backup cavity, in which the grooves which form the backup cavity may be coated with a substantially impermeable coating (to, for example, prevent corrosion) which may be removable while on the drilling vessel for use of the backup cavity. In still another embodiment, the grooves that form the backup cavity may be fitted with a sealing element (such as an elastomeric ring or similar device) to protect the grooves.

The axial shear elements shown in FIGS. 4-7 may be substantially rectangular in cross-section, and, in certain embodiments, may be generally cylindrical with their axis substantially parallel to the axis of the riser. However, the axial shear elements may also be generally oval in shape, or a chamfered rectangle, or other shapes with a substantially rectangular cross section. The axial shear elements may also have other cross-sections without departing from the teachings of the present disclosure, including but not limited-to circular cross-sections (such as for spherical or spherical-cylindrical elements) or square or trapezoidal, provided that the axial shear elements mate properly with the pin and box load surfaces. Furthermore, the axial shear elements may have a generally arcuate shape, or one or more of the surfaces of an axial shear element may be arcuate in at least one cross-section, to, for example, better mate with the pin and box load surfaces, or for easier insertion and withdrawal of the axial shear elements.

In one embodiment of the present disclosure, the removable axial shear elements may be inserted individually, that is, unattached to one another. Referring now to FIGS. 8A-8C, the removable axial shear elements may be joined together in any of various contiguous configurations, such as "belt" or "bandolier" or "string-of-pearls" configurations as shown in accordance with embodiments of the present disclosure. In select embodiments of the present disclosure, the removable axial shear elements may be substantially spherical. In a related embodiment, the removable axial shear elements may be spherical, and joined together in a "string-of-pearls" configuration such as with wire rope or a similarly flexible member passing through the center of each spherical shear element. In still another related embodiment, the removable axial shear elements may be affixed at selected intervals to a flexible member running through their centers, as, for example, by potting. In another related embodiment, a flexible member to which the removable axial shear elements are attached may be equipped with a loop or anchor-like device on at least one distal end to facilitate removal of the shear elements from the riser connector. In yet another embodiment, contiguous shear elements may be jointed together by hinges to form a belt or "bandolier."

Hinges included between the shear elements may include hinge pins in certain embodiments. In further embodiments, the hinges may include a flexible member, such as an elastomer. In another embodiment, the shear elements may be molded into a flexible belt, for example, comprising fiber or fabric reinforced elastomer. In another related embodiment, the reinforcement fabric may include aramid fibers.

In select embodiments of the present disclosure, the shear elements that form the bandolier may be generally cylindrical-shaped, and installed in a shear element cavity such that their axes are substantially parallel to a longitudinal centerline of the marine drilling riser. In other embodiments, the shear elements may be generally rectangular or trapezoidal in horizontal cross-section. In yet other embodiments, the shear elements may be substantially rectangular or trapezoidal in a vertical cross-section taken on a radius of the riser connection. In still other embodiments of the current invention, a unitized "belt" of shear elements may be machined from a single block of metal such that there are machined "kerfs" at regular intervals along the belt defining the individual shear elements, and allowing the belt to flex at the thin section under the kerf.

In certain embodiments of the present disclosure, a flexible belt or "bandolier" of shear elements may be configured with slightly tapered shear element heights such that the shear elements are taller at one end of the belt than the other. In a related embodiment, a flexible belt of shear elements may include groups of shear elements of staggered heights, such that there are several elements of the same height.

In select embodiments of the present disclosure, the at least one shear element port may be arranged substantially tangential to the cavity formed between the two mating riser joints. In a related embodiment, the at least one shear element port may be arranged within 15 degrees of a tangent to the cavity formed between the two mating riser joints. In another embodiment, the shear element port may generally be arranged radially, but has one or more circumferential surfaces which are radiused in order to approximate a tangential port.

In certain embodiments of the present disclosure, the replaceable shear elements may be inserted and removed using hydraulic or pneumatic pressure applied to a string of removable shear elements. In a related embodiment, the replaceable shear elements may be "chased" with a compliant pig or "wad" to provide a hydraulic or pneumatic seal against the shear element cavity. In another embodiment, the replaceable shear elements may be mechanically inserted and removed using a ram-rod or similar device. In related embodiments, the ram-rod may be powered hydraulically, pneumatically, electrically, or mechanically as by a driving screw.

In select embodiments of the present disclosure, the removable axial shear elements may be installed or removed from the riser connection while the riser connection assembly is being preloaded. In another embodiment, the removable axial shear elements may be installed before the riser connection is preloaded, and may be removed from the riser connection after the riser preload has been removed from the riser connection. In another embodiment of the method of assembly of the present disclosure, two drilling riser joints may be stabbed together, removable shear elements may be inserted, an axial preload may be applied to the riser connection, and a threaded shoulder may be made-up to trap the riser connection in the preloaded state. In a related embodiment, a threaded shoulder may be made-up both to trap the riser connection in the preloaded state and to substantially contribute to the axial preload of the riser connection.

In another related embodiment, an externally applied split ring may be used instead of a threaded shoulder to trap the riser connection. In another related embodiment, the externally applied split ring comprises axially-oriented "pusher" studs to adjust the effective axial length of the split ring, and optionally to increase the preloading. In another embodiment of the present disclosure, a means of trapping the riser preload, for example a threaded member or a split ring, also includes a means of covering the shear element ports.

In a related method of assembly of the present disclosure, a selected preload stress may be preserved within a riser riser connection by, for example, the use of different-sized removable shear elements, depending upon the final position of the riser riser connection within the riser string. For example, a preload "gradient" may be desired, with higher axial preloads at the top of the riser string, and progressively lower preloads at deeper depths.

In certain embodiments of the present disclosure, a shear surface of one shear cavity may be remedially machined on-board the drilling vessel, as with a portable radial groove cutting tool affixed to the riser connection, such that the reworked riser connection may, for example, continue to be used when fitted with special "emergency" removable shear elements which are larger than standard elements.

Advantageously, embodiments of the present disclosure for a riser connection using shear elements may provide an inexpensive and reliable riser riser connection that will tolerate a high axial preload. Further, embodiments disclosed herein may provide a marine drilling riser connector and method of assembly/disassembly that allows the riser string to be assembled and disassembled very quickly. Still further, embodiments disclosed herein may provide a marine drilling riser that may be safely stored, maintained, and reconditioned independent of its removable, interchangeable, replaceable, and repairable load-carrying shear elements. For example, redundant grooves may provide a riser connection that is reliable in the event of a failure of the shear elements in a first series of grooves, the shear elements in a second series of grooves may prevent a failure of the riser connection of riser joints. Finally, the marine drilling riser of embodiments disclosed herein may effectively and more efficiently share loads between axially separated shear elements.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A riser joint connection comprising:
    a box connector comprising a box bore shoulder, a box face, a box face surface, and an external box preload fixture projecting from an outer surface of the box connector such that a face of the external box preload fixture extends in a direction orthogonal to a longitudinal direction of the riser joint connection;
    a pin connector comprising a pin connector shoulder, a pin nose, and an external pin preload fixture projecting from an outer surface of the pin connector such that a face of the external pin preload fixture extends in a direction orthogonal to the longitudinal direction of the riser joint connection and a pin nose; and
    a plurality of shear elements joined together by hinges in a bandolier configuration, the plurality of shear elements disposed within a shear element cavity defined by a box connector shear groove in alignment with a pin connector shear groove,
    wherein the plurality of shear elements contact and are compressed between load surfaces of the pin connector and the box connector such that the plurality of shear elements are preloaded in compression and are maintained compressed between the load surfaces of the pin connector and the box connector,
    wherein the box bore shoulder compressively engages the pin nose,
    wherein the box face surface compressively engages the pin connector shoulder,
    wherein the face of the external box preload fixture and the face of the external pin preload fixture are parallel to each other, and
    wherein the pin preload fixture and the box preload fixture are disposed on one axial side of the plurality of shear elements, and
    wherein the box face and the pin nose are preloaded in compression by applying an axial compressive preload force to the external box preload fixture and the external pin preload fixture.

2. The riser connection of claim 1, wherein the plurality of shear elements have a cross-section selected from a group consisting of substantially rectangular, oval, chamfered rectangle, circular, square, and trapezoidal.

3. The riser connection of claim 1, comprising a plurality of shear element cavities.

4. The riser connection of claim 1, wherein the selected axial compressive preload forces applied to the pin connector and the box connector determines a height of the shear element cavity.

5. The riser connection of claim 1, wherein the plurality of shear elements are removed from the riser joint connection when the riser joint is disconnected.

6. The riser connection of claim 1, wherein at least one shear element port is arranged substantially tangential to the at least one shear element cavity formed between the two mating riser joints.

7. A riser joint connection comprising:
    a box connector comprising a box bore shoulder, a box face, a box face surface, and an external box preload fixture projecting from an outer surface of the box connector;
    a pin connector comprising a pin connector shoulder, a pin nose, and an external pin preload fixture projecting from an outer surface of the pin connector such that a face of the external pin preload fixture extends in a direction orthogonal to the longitudinal direction of the riser joint connection and a pin nose; and
    a plurality of shear elements joined together by hinges in a bandolier configuration, the plurality of shear elements disposed within a shear element cavity defined by an internal box connector shear groove in alignment with an external pin connector shear groove, such that all faces of the shear element are adjacent either the box connector shear groove or the pin connector shear groove,
    wherein the plurality of shear elements contact and are compressed between load surfaces of the pin connector and the box connector such that the plurality of shear elements are preloaded in compression and are maintained compressed between the load surfaces of the pin connector and the box connector,
    wherein the box connector engages the pin connector such that a gap is formed therebetween, and
    wherein one of the box face and the pin nose is preloaded in compression by applying an axial compressive preload force to the external box preload fixture and the external pin preload fixture;
    wherein, when the box face surface compressively engages the pin connector shoulder, the gap is formed between the box bore shoulder and the pin nose and the box is preloaded in compression.

* * * * *